United States Patent
Tanahashi (10) Patent No.: US 8,424,206 B2
(45) Date of Patent: Apr. 23, 2013

(54) PRODUCTION LINE FOR VEHICLES OF DIFFERENT MODELS

(75) Inventor: Hideyuki Tanahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1441 days.

(21) Appl. No.: 12/047,515

(22) Filed: Mar. 13, 2008

(65) Prior Publication Data

US 2008/0223692 A1    Sep. 18, 2008

(30) Foreign Application Priority Data

Mar. 13, 2007  (JP) ................. 2007-063828

(51) Int. Cl.
*B21D 39/00*  (2006.01)
*B23Q 7/00*   (2006.01)

(52) U.S. Cl.
USPC ............. 29/897.2; 29/429; 29/430; 29/822; 29/823; 29/824

(58) Field of Classification Search ........... 29/429, 29/430, 464, 468, 559, 783, 784, 791, 799, 29/822, 823, 824, 281.1, 281.5; 198/346.3, 198/678.1, 681, 687.1
See application file for complete search history.

(56) References Cited

U.S. PATENT DOCUMENTS 6,814,219 B2 * 11/2004 Shimizu ................ 198/465.4
7,461,733 B2 * 12/2008 Dohi .................... 198/346.3

FOREIGN PATENT DOCUMENTS

| JP | S58-194956 | 12/1983 |
| JP | S61-12465 | 1/1986 |
| JP | 63-13857 | 1/1988 |
| JP | 04-354632 | 12/1992 |

* cited by examiner

Primary Examiner — Jermie Cozart
(74) Attorney, Agent, or Firm — Rankin, Hill & Clark LLP (57) ABSTRACT

A production line for vehicles of different models is disclosed, wherein vehicle bodies for ordinary automobiles and vehicle bodies for compact automobiles are incorporated on the same production line, and multiple components are installed. Two compact vehicle bodies are carried on a conveyance device which is designed for carrying a single ordinary vehicle body. The number of components of a compact automobile is approximately half the number of components of an ordinary automobile, and therefore compact automobiles can be produced efficiently without any downtime.

12 Claims, 7 Drawing Sheets

PRODUCTION LINE FOR VEHICLES OF DIFFERENT MODELS

FIELD OF THE INVENTION

The present invention relates to a line for producing vehicles of different models while conveyance devices carrying vehicle bodies thereon are conveyed along a conveyance line.

BACKGROUND OF THE INVENTION

Choosing automobiles that match one's lifestyle is a recent trend, and a stronger demand exists for compact (small-sized) automobiles having a smaller occupant capacity (two to three people) in the same way as for ordinary (regular-sized) automobiles that have a regular occupant capacity (five people).

Since compact automobiles have an occupant capacity of two to three people, they need only one row of seats, and the total length of the automobile can be shortened to approximately half the length of an ordinary automobile.

A production line designated for compact automobiles must be newly prepared in order to manufacture the compact automobiles. However, the need to prepare a new production line designated for compact automobiles raises the equipment costs of production lines and poses an obstacle to keeping the costs of such compact automobiles low.

Additionally, extra space must be ensured within the production factory in order to prepare a new production line designated for compact automobiles.

One example of a production line is a mixed production line for producing vehicles of different models, such as sports cars or station wagons, as is disclosed in the Japanese Publication JP 63-013857 A or Japanese Patent No. 3008220.

Sports cars, stations wagons, and other vehicle models each have different numbers of components. A mixed production line for producing vehicles with different numbers of components is provided with a bypass conveying line.

For example, mixed production with vehicles having a small number of components is adjusted by causing vehicles having a large number of components to go through the bypass conveying line.

It is possible to absorb the difference in the number of components by using a bypass production line because sports cars, station wagons, and other vehicles merely have small differences in the numbers of components.

However, compact automobiles have approximately half the number of components of ordinary automobiles. Consequently, in the mixed production line disclosed in JP 63-13857 A, when compact automobiles are incorporated into an ordinary automobile production line, the number of steps for assembling a compact automobile is approximately half the number of steps for assembling an ordinary automobile.

When the number of steps for assembling a compact automobile decreases by half, it is difficult to adequately absorb the difference in the number of components by using the bypass conveying line disclosed in JP 63-13857 A. In this case, the solution is to set the assembly operation time for compact automobiles in accordance with the assembly operation time for larger automobiles.

Therefore, there is much idle time in the assembly operation for compact automobiles, and it is difficult to produce compact automobiles efficiently.

SUMMARY OF THE INVENTION

It is therefore an object of the present invention to provide a production line for vehicles of different models that can produce compact automobiles more efficiently when compact automobiles having different numbers of components than ordinary automobiles are incorporated into an ordinary automobile production line.

According to a first aspect of the present invention, there is provided a production line for vehicles of different models, including a plurality of conveying mechanisms for conveying along a conveying line respective conveyance devices with vehicle bodies carried thereon in such a manner as to allow components to be installed on the vehicle bodies, wherein each of the conveying devices is adapted to carry two of the vehicle bodies.

Compact automobiles herein have approximately half the number of components of an ordinary automobile, for example. It is possible to form a single unit from the vehicle bodies of two compact automobiles in the production line by mounting two compact automobile vehicle bodies on a conveying hanger.

Two unitized vehicle bodies have approximately the same number of components as an ordinary automobile, and the number of assembly steps is approximately the same as an ordinary automobile. Consequently, two unitized vehicle bodies can have the same number of assembly steps as the vehicle body of an ordinary automobile. Thereby, when the vehicle bodies of compact automobiles and ordinary automobiles are produced together, compact automobiles can be produced more efficiently without any idle time in the steps of assembling the compact automobiles.

In the production line described above, it is preferred that in a state in which two vehicle bodies are mounted on a conveyance device, the total length of the two mounted vehicle bodies be equal to the maximum total length of an ordinary vehicle body that can be conveyed along the conveying line. Consequently, conveyance devices for mounting two vehicle bodies can be placed at the same intervals as conveyance devices for mounting one vehicle body of an ordinary automobile. Two unitized vehicle bodies can thereby be conveyed at the same intervals as vehicle bodies of ordinary automobiles, and compact automobiles can be produced more efficiently.

In a state in which two vehicle bodies are mounted on a conveyance device, it is preferred that the total length of the two mounted vehicle bodies be less than the maximum total length of an ordinary vehicle body that can be conveyed along the conveying line.

In a state in which two vehicle bodies are mounted on a conveyance device, it is preferred that each of the two mounted vehicle bodies is the body of a vehicle having an occupant capacity of two people.

In a state in which two vehicle bodies are mounted on a conveyance device, it is preferred that the two mounted vehicle bodies be mounted on the conveyance device so that rear parts thereof face each other.

According to a second aspect of the present invention, there is provided a production line for vehicles of different models, which comprises: a conveying line; and a plurality of conveyance devices adapted to be conveyed along the conveying line and designed to carry a single first vehicle body, wherein one of the conveyance devices is configured to carry two second vehicle bodies of a different model than the first vehicle body.

The first vehicle body may, for example, be a vehicle body of an ordinary automobile according to the embodiments, and the second vehicle body may be a vehicle body of a compact automobile. The total length of two compact automobiles is approximately equal to the total length of one ordinary automobile.

The conveyance device preferably has multiple brackets for supporting a first vehicle body or two second vehicle bodies in the anteroposterior direction of the mounted vehicles. Therefore, the conveyance device can support a single first vehicle body, and can also support two second vehicle bodies.

According to a third aspect of the present invention, there is provided a method for producing vehicles of different models, comprising the steps of: conveying multiple conveyance devices, each of which is used for mounting a single first vehicle body, along a conveying line; and mounting two second vehicle bodies on each of the conveyance devices when the second vehicle bodies of a different model than the first vehicle body are incorporated into the conveying line.

According to a fourth aspect of the present invention, there is provided a production line for vehicles of different models, comprising: a conveying line; a plurality of first conveyance devices conveyed along the conveying line and used for mounting a first vehicle body; and a sub-line whereby a plurality of second conveyance devices that are the same as the first conveyance devices and that carry second vehicle bodies are supplied to the conveying line with short intervals when the second vehicle bodies of a different model than the first vehicle body are incorporated and assembled in an array of the first vehicle bodies.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
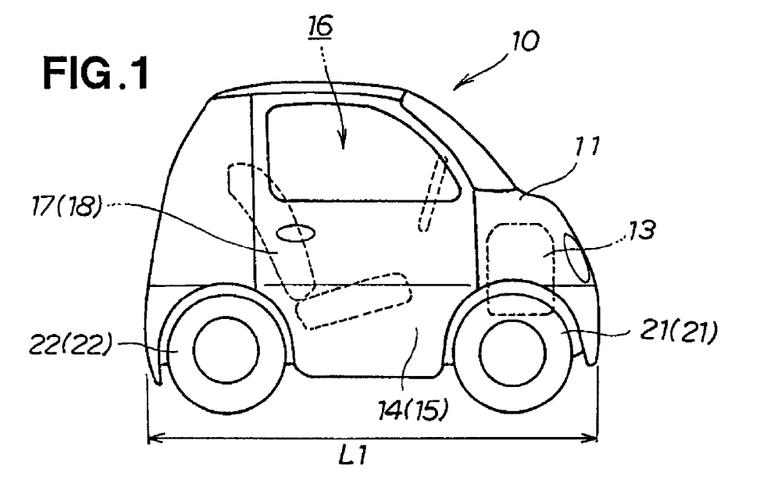
FIG. 1 is a side elevational view showing a compact automobile produced in a production line according to the present invention.
Figure 2:
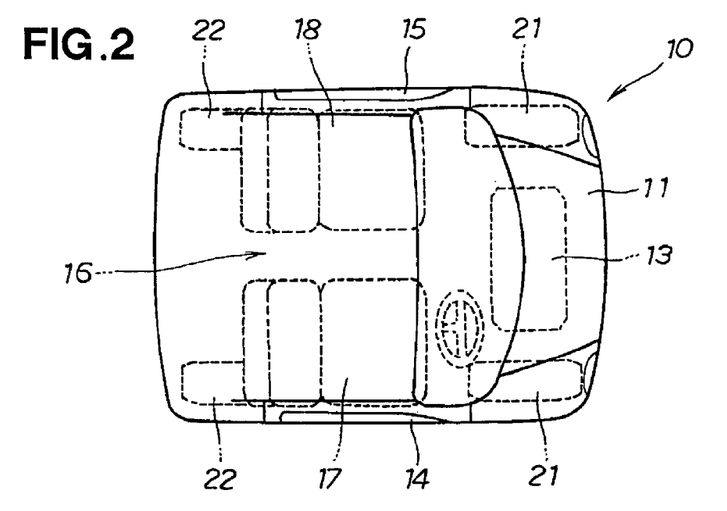
FIG. 2 is a top plan view showing the compact automobile of FIG. 1.

A first embodiment of the present invention will now be discussed with reference to FIGS. 1 to 8. As shown in FIGS. 1 and 2, a compact automobile 10 comprises an engine 13 disposed at the front of a vehicle body 11, a right side door 14 disposed on the right side of the vehicle body 11, a left side door 15 disposed on the left side of the vehicle body 11, a driver seat 17 disposed on the right side within a passenger compartment 16, a passenger seat 18 disposed on the left side within the passenger compartment 16, left and right front wheels 21, 21 disposed at the front of the vehicle body 11, and left and right rear wheels 22, 22 disposed at the rear of the vehicle body 11.

The compact automobile 10 is a vehicle having an occupant capacity of two people, including the driver seat 17 and the passenger seat 18.

The total length L1 of the compact automobile 10 is approximately half the total length L2 of an ordinary automobile 25 shown in FIG. 3C.

The first embodiment relates to a compact automobile 10 having an occupant capacity of two people, but this automobile may also have an occupant capacity of three people, in which case a center seat (not shown) is provided between the driver seat 17 and the passenger seat 18, for example.

Figure 3:
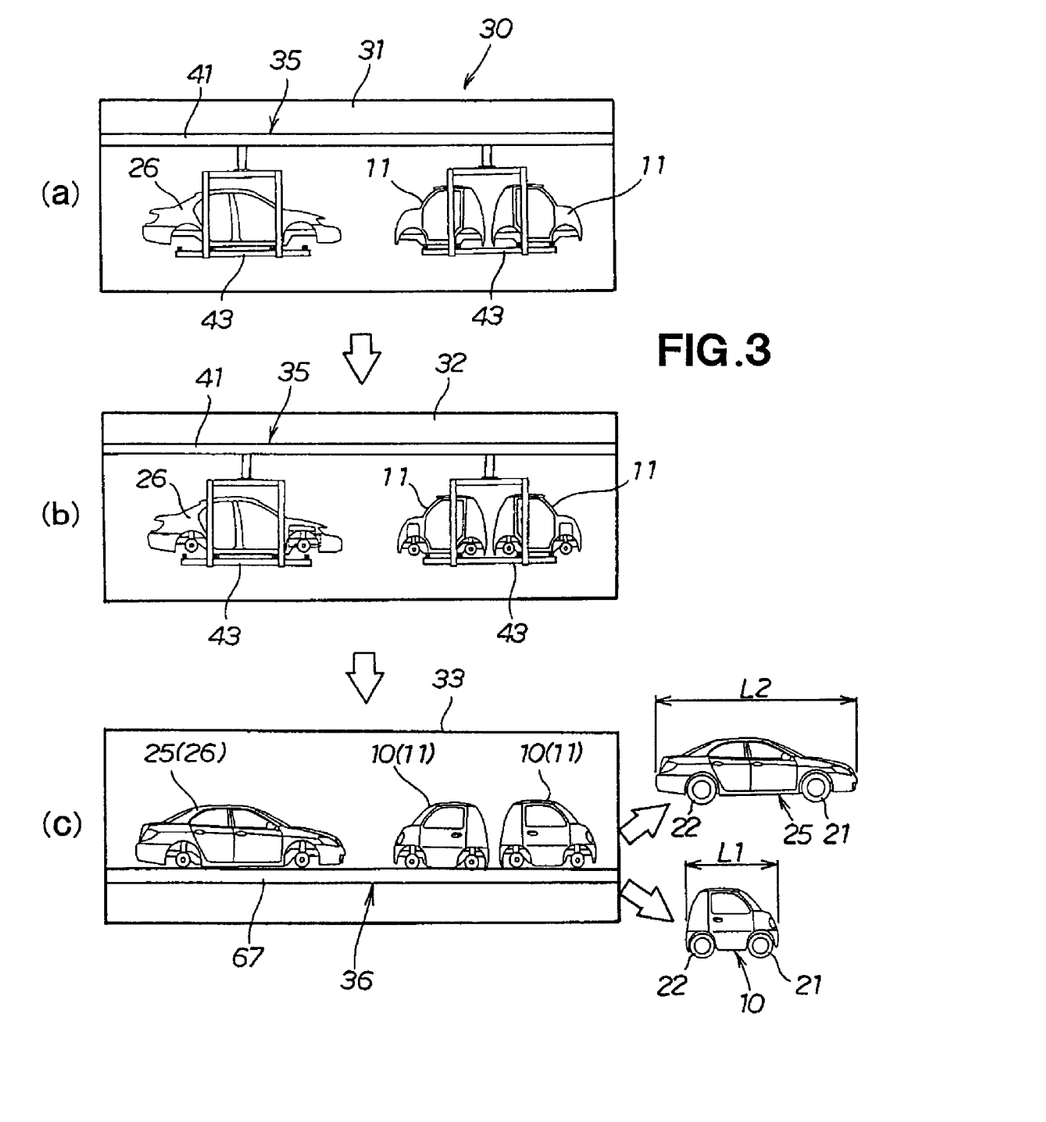
FIG. 3(a) is a schematic view showing a production line for vehicles of different models according to a first embodiment of the present invention.
FIG. 3(b) is a schematic view showing a production line according to the present invention using a first conveying mechanism.
FIG. 3(c) is a schematic view showing a production line according to the present invention using a second conveying mechanism.

Referring to FIG. 3, a vehicle production line 30 comprises a painting area 31 for painting a vehicle body 26 of the ordinary automobile 25 and the vehicle body 11 of the compact automobile 10; a drive system installation area 32 for installing drive systems composed of engines, suspension systems, and the like into the vehicle body 26 of the ordinary automobile 25 and the vehicle body 11 of the compact automobile 10; and an exterior and interior installation area 33 for installing side doors and seats in the vehicle body 26 of the ordinary automobile 25 and the vehicle body 11 of the compact automobile 10.

The vehicle production line 30 further comprises a first conveying mechanism 35 for conveying the vehicle body 26 of the ordinary automobile 25 and vehicle bodies 11, 11 of compact automobiles 10 in a suspended state; and a second conveying mechanism 36 for conveying the vehicle body 26 of the ordinary automobile 25 and vehicle bodies 11, 11 of compact automobiles 10 in a mounted state.

In the exterior and interior installation area 33 shown in FIG. 3C, after side doors and seats are installed in the vehicle body 26 of the ordinary automobile 25 and the vehicle body 11 of the compact automobile 10, front wheels 21, 21 and rear wheels 22, 22 are installed in the vehicle body 26 of the ordinary automobile 25 and the vehicle body 11 of the compact automobile 10, thereby completing the assembly steps of the ordinary automobile 25 and the compact automobile 10.

The first conveying mechanism 35 conveys the vehicle body 26 of the ordinary automobile 25 and the vehicle body 11 of the compact automobile 10 in a suspended state through the painting area 31, and also conveys the vehicle body 26 of the ordinary automobile 25 and the vehicle body 11 of the compact automobile 10 in a suspended state through the drive system installation area 32 as shown in FIG. 3B.

The second conveying mechanism 36 conveys the vehicle body 26 of the ordinary automobile 25 and the vehicle body 11 of the compact automobile 10 in a mounted state on a belt conveyor through the exterior and interior installation area 33.

Figure 4:
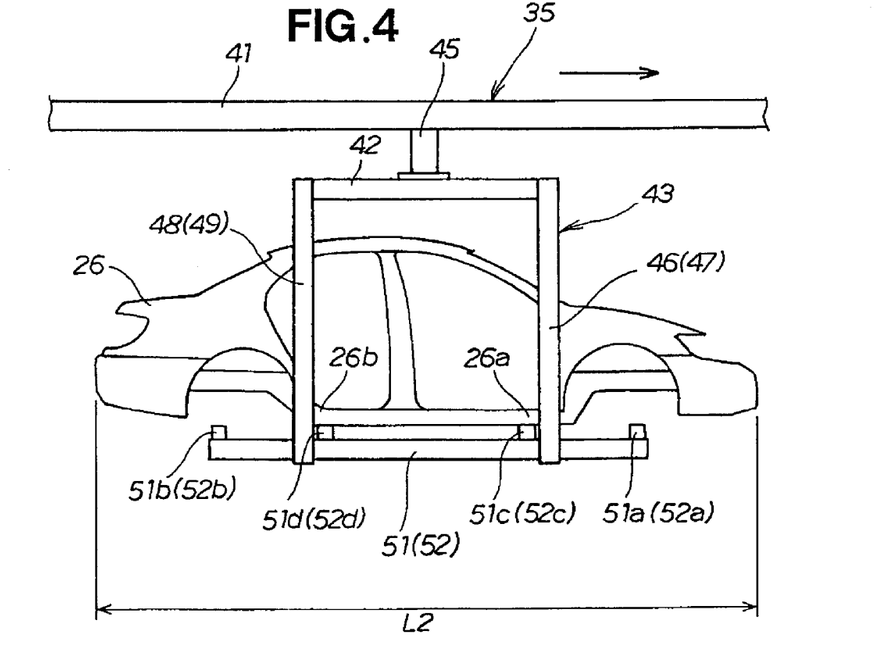
FIG. 4 is a side elevational view showing an ordinary vehicle body placed on a conveyance device shown in FIG. 3.
Figure 5:
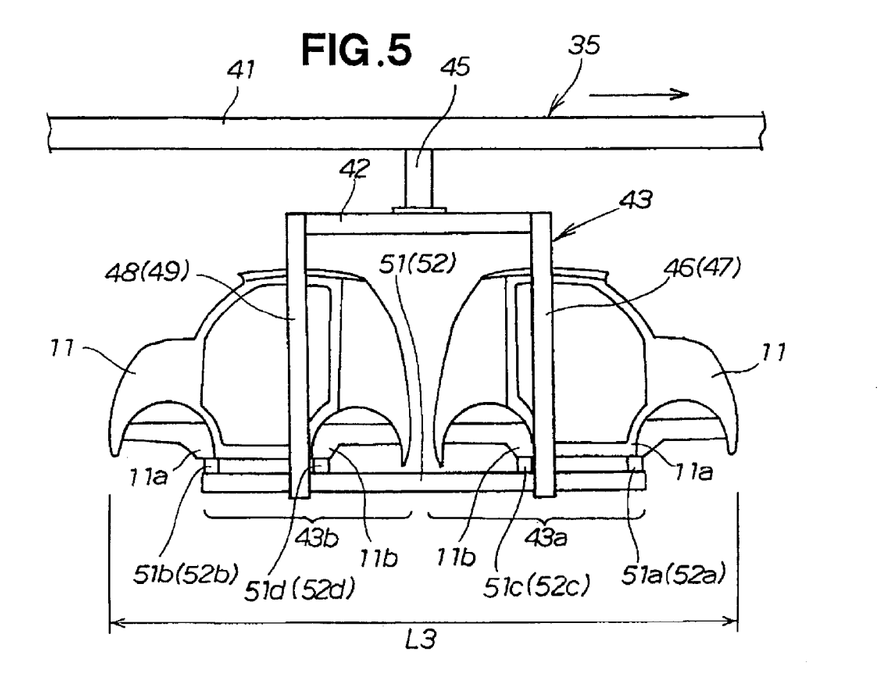
FIG. 5 is a side elevational view showing two compact vehicle bodies placed on the conveyance device of FIG. 3.

FIG. 4 shows the vehicle body 26 of an ordinary automobile mounted on the first conveying mechanism 35, and FIG. 5 shows vehicle bodies 11, 11 of compact automobiles mounted on the first conveying mechanism 35.

The first conveying mechanism 35 comprises a guide rail (conveying line) 41 provided above the painting area 31 and the drive system installation area 32 shown in FIG. 3, a carrier 42 moveably suspended from the guide rail 41, a conveying hanger (conveying device) 43 provided to the suspended carrier 42, and a moving device (not shown) for moving the carrier 42 along the guide rail 41.

The suspended carrier 42 is linked to the guide rail 41 via a support arm 45. Rollers (not shown) are provided at the top end of the support arm 45. The suspended carrier 42 is disposed to be movable along the guide rail 41 via the rollers.

The conveying hanger 43 is composed of right and left front hanger frames 46, 47 provided at the front end of the carrier 42, right and left rear hanger frames 48, 49 provided at the rear end of the carrier 42, a right support 51 provided at the bottom ends of the right front hanger frame 46 and the right rear hanger frame 48, and a left support 52 provided at the bottom ends of the left front hanger frame 47 and the left rear hanger frame 49.

The right and left front hanger frames 46, 47 are bilaterally symmetric, as are the right and left rear hanger frames 48, 49.

A first right bracket 51a is provided at the front end of the right support 51, a second right bracket 51b is provided at the rear end, a third right bracket 51c is provided behind the first right bracket 51a (in proximity to the right front hanger frame 46), and a fourth right bracket 51d is provided in front of the second right bracket 51b (in proximity to the right rear hanger frame 48).

A first left bracket 52a is provided at the front end of the left support 52, a second left bracket 52b is provided at the rear end, a third left bracket 52c is provided behind the first left bracket 52a (in proximity to the left front hanger frame 47), and a fourth left bracket 52d is provided in front of the second left bracket 52b (in proximity to the left rear hanger frame 49).

The right and left supports 51, 52 are bilaterally symmetrical, and the first through fourth right brackets 51a to 51d, as well as the first through fourth left brackets 52a to 52d, are also bilaterally symmetrical.

One example of the aforementioned moving device is a setup in which the suspended carrier 42 is connected by a chain (not shown), and the chain is driven to move the suspended carrier 42 along the guide rail 41 as shown by the arrow.

An example of mounting the vehicle body 26 of the ordinary automobile 25 on the conveyance device 43 will be described with reference to FIG. 4. The vehicle body 26 of the ordinary automobile 25 is hereinbelow referred to as a "ordinary vehicle body 26."

The third right bracket 51c of the right support 51 and the third left bracket 52c of the left support 52 bear the front part 26a of the ordinary vehicle body 26. The fourth right bracket 51d of the right support 51 and the fourth left bracket 52d of the left support 52 bear the rear part 26b of the ordinary vehicle body 26. The ordinary vehicle body 26 is mounted facing forward on the conveying hanger 43.

An example of mounting a vehicle body 11 of a compact automobile 10 on both the front half 43a and rear half 43b of the conveying hanger 43 will be described with reference to FIG. 5. Hereinbelow, the vehicle body 11 of the compact automobile 10 mounted facing forward on the front half 43a of the conveying hanger 43 is referred to as the "forward-facing compact vehicle body 11," and the vehicle body 11 of the compact automobile 10 mounted facing backward on the rear half 43b of the conveying hanger 43 is referred to as the "backward-facing compact vehicle body 11."

The first right bracket 51a of the right support 51 and first left bracket 52a of the left support 52 bear the front part 11a of the forward-facing compact vehicle body 11. The third right bracket 51c of the right support 51 and the third left bracket 52c of the left support 52 bear the rear part 11b of the forward-facing compact vehicle body 11. The forward-facing compact vehicle body 11 is mounted facing forward on the front half 43a of the conveying hanger 43.

The second right bracket 51b of the right support 51 and the second left bracket 52b of the left support 52 bear the front part 11a of the backward-facing compact vehicle body 11. The fourth right bracket 51d of the right support 51 and the fourth left bracket 52d of the left support 52 bear the rear part 11b of the backward-facing compact vehicle body 11. The backward-facing compact vehicle body 11 is mounted facing backward on the rear half 43b of the conveying hanger 43.

Thus, the forward-facing compact vehicle body 11 is mounted facing forward on the front half 43a of the conveying hanger 43, and the backward-facing compact vehicle body 11 is mounted facing backward on the rear half 43b of the conveying hanger 43, whereby two compact automobiles 10 are mounted on a single conveying hanger 43.

The compact automobiles 10 shown in FIG. 5 have a total length L1 (FIG. 3), and the ordinary automobile 25 shown in FIG. 3 has a total length L2 (FIG. 2). The total length L1 is reduced to about half of the total length L2.

For the sake of convenience, the total length L2 of the ordinary automobile 25 is assumed to be the maximum total length of a vehicle body that can be conveyed along the guide rail 41.

With the two compact vehicle bodies 11 mounted on the conveying hanger 43, the total length L3 of the two mounted compact vehicle bodies 11 is either approximately equal to the maximum total length L2 of a vehicle body that can be conveyed along the guide rail 41, or is kept smaller than the maximum total length L2.

In the first embodiment, the total length L3 of the two mounted compact vehicle bodies 11 is described as being approximately equal to the maximum total length L2.

Figure 6:
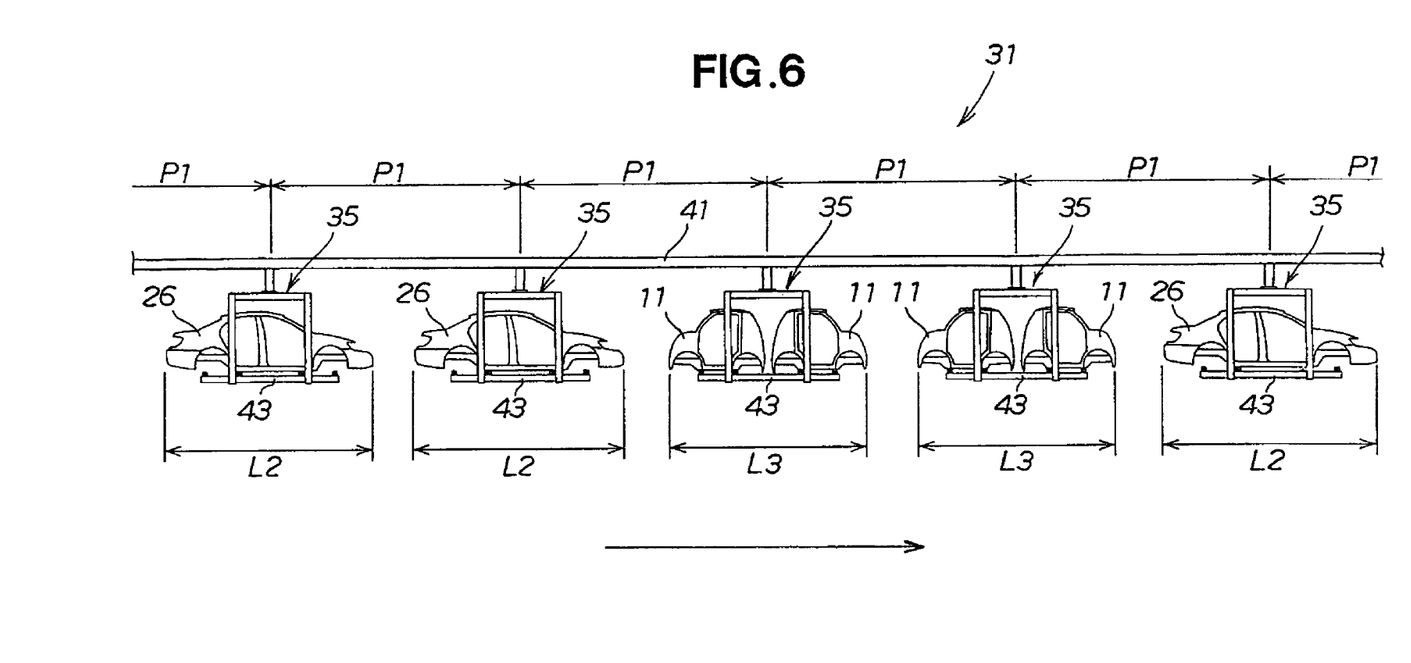
FIG. 6 is a schematic view showing the step of painting ordinary vehicle bodies and compact vehicle bodies in the production line of FIG. 3.
Figure 7:
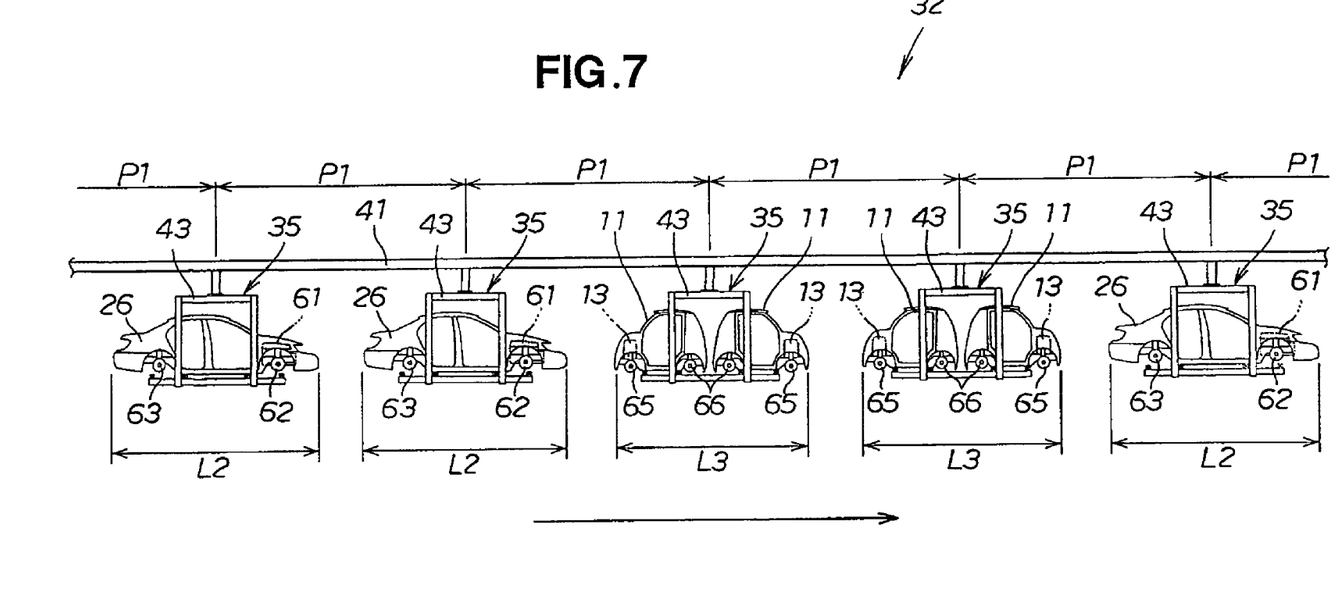
FIG. 7 is a schematic view showing the step of installing engines, suspension systems and other components in ordinary vehicle bodies and compact vehicle bodies in the production line of FIG. 3.
Figure 8:
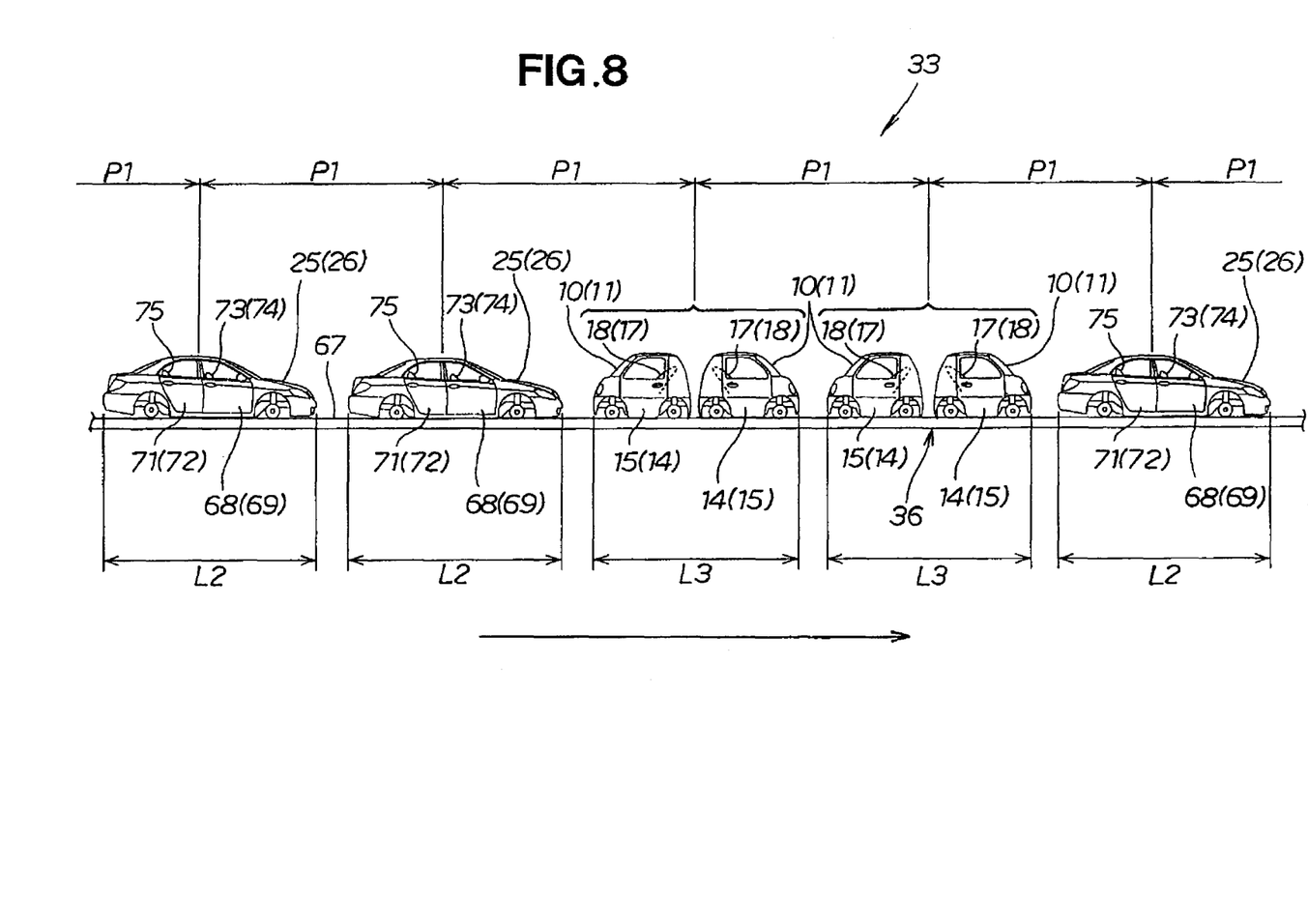
FIG. 8 is a schematic view showing the step of assembling exterior and interior components in ordinary vehicle bodies and compact vehicle bodies in the production line of FIG. 3.

The following is a description, made with reference to FIGS. 6 through 8, of an example of assembly in which four compact vehicle bodies 11 are incorporated among multiple ordinary vehicle bodies 26 in the vehicle production line 30.

Two compact vehicle bodies 11 are formed into a single unit by being mounted on a conveying hanger 43, as shown in FIG. 6. The total length L3 of two unitized compact vehicle bodies 11 is approximately equal to the total length L2 (maximum total length L2) of an ordinary automobile 25.

Consequently, in the painting area 31, both the conveyance devices 43 on which two compact vehicle bodies 11 are mounted as a single unit, and the conveying hangers 43 on which ordinary vehicle bodies 26 are mounted can be moved along the guide rail 41 at equal intervals P1 in the direction of the arrow.

The surface area of a compact vehicle body 11 is approximately half the surface area of an ordinary vehicle body 26. Therefore, the surface area of two unitized compact vehicle bodies 11 is approximately equal to the surface area of an ordinary vehicle body 26.

Consequently, the time required to paint two unitized compact vehicle bodies 11 can be approximately equal to the time required to paint an ordinary vehicle body 26.

Thus, two unitized compact vehicle bodies 11 can be conveyed at the same interval P1 as an ordinary vehicle body 26, and the painting time for a single unit of two compact vehicle bodies 11 can be approximately equal to the painting time for an ordinary vehicle body 26. Consequently, when two unitized compact vehicle bodies 11 are incorporated among ordinary vehicle bodies 26 and painted, the compact vehicle bodies 11 can be painted in approximately the same time as an ordinary vehicle body 26. The compact vehicle bodies 11 can thereby be painted efficiently.

FIG. 7 shows the steps of installing engines, suspension systems, and other components in ordinary vehicle bodies and compact vehicle bodies.

In the drive system installation area 32, the ordinary vehicle bodies 26 and the compact vehicle bodies 11 are conveyed by conveying hangers 43, similar to the painting area 31. In the drive system installation area 32, conveying hangers 43 on which two unitized compact vehicle bodies 11 are mounted, as well as conveying hangers 43 on which a single ordinary vehicle body 26 is mounted, are moved along the guide rail 41 at equal intervals P1 in the direction of the arrow.

In the drive system installation area 32, components that include engines 61, front and rear suspension systems 62, 63, and the like are installed in the ordinary vehicle bodies 26.

Similarly, components that include engines 13, front and rear suspension systems 65, 66, and the like are installed in the compact vehicle bodies 11.

The engines 13 of the compact vehicle bodies 11 are smaller and lighter than the engines 61 of the ordinary vehicle bodies 26. The front and rear suspension systems 65, 66 of the compact vehicle bodies 11 are smaller and lighter than the front and rear suspension systems 62, 63 of the ordinary vehicle bodies 26.

Consequently, the time required to install the engines 13, front and rear suspension systems 65, 66, and the like in two of the unitized compact vehicle bodies 11 can be approximately equal to the time required to install the engine 61 and front and rear suspension systems 62, 63 in one of the ordinary vehicle bodies 26.

Thus, two unitized compact vehicle bodies 11 can be conveyed in the same interval P1 as an ordinary vehicle body 26, and the time required to install the engines 13, front and rear suspension systems 65, 66, and the like in two of the unitized compact vehicle bodies 11 can be approximately equal to the time required to install the engine 61, front and rear suspension systems 62, 63, and the like in one of the ordinary vehicle bodies 26.

Consequently, when two unitized compact vehicle bodies 11 are incorporated among ordinary vehicle bodies 26, and engines and suspension systems are installed in the two unitized compact vehicle bodies 11, the assembly time can be approximately equal to the assembly time of an ordinary vehicle body 26.

The engines 13, front and rear suspension systems 65, 66, and other components can thereby be efficiently installed in the compact vehicle bodies 11.

FIG. 8 shows the steps of installing exterior and interior components in ordinary vehicle bodies and compact vehicle bodies.

The ordinary vehicle bodies 26 and compact vehicle bodies 11 are conveyed through the exterior and interior installation area 33 on a belt conveyor (conveying line) 67 in the second conveying mechanism 36.

Two of the compact vehicle bodies 11 are conveyed as a unit in the exterior and interior installation area 33 as well, similar to the painting area 31 (FIG. 6) and the drive system installation area 32 (FIG. 7).

Consequently, the two unitized compact vehicle bodies 11 can be moved by the belt conveyor 67 in the direction of the arrow at the same intervals P1 as the ordinary vehicle bodies 26.

In the exterior and interior installation area 33, right and left front side doors 68, 69, right and left rear side doors 71, 72, driver seats 73, passenger seats 74, rear seats 75, and other components are installed in the ordinary vehicle bodies 26.

Similarly, right and left side doors 14, 15, driver seats 17, passenger seats 18, and other components are installed in the compact vehicle bodies 11.

Thus, two doors, namely the right and left side doors 14, 15, are installed in each of the compact vehicle bodies 11. Four doors, namely the right and left front side doors 68, 69 and the right and left rear side doors 71, 72, are installed in each of the ordinary vehicle bodies 26. Consequently, the time required to install side doors in two of the unitized compact vehicle bodies 11 is approximately equal to the time required to install side doors in one of the ordinary vehicle bodies 26.

Furthermore, two seats, namely the driver seat 17 and the passenger seat 18, are installed in each of the compact vehicle bodies 11. Four seats, namely the driver seat 73, the passenger seat 74, and the rear seats 75, are installed in each of the ordinary vehicle bodies 26. Consequently, the time required to install seats in two of the unitized compact vehicle bodies 11 is approximately equal to the time required to install seats in each of the ordinary vehicle bodies 26.

Thus, two of the unitized compact vehicle bodies 11 can be conveyed in the same interval P1 as one of the ordinary vehicle bodies 26, and the time required to install two side doors 14, 15, two seats 17, 18, and the like in the two unitized compact vehicle bodies 11 is approximately equal to the time required to install four side doors 68, 69, 71 72, four seats 73, 74, 75, and the like in the ordinary vehicle body 26.

Consequently, when two unitized compact vehicle bodies 11 are incorporated among ordinary vehicle bodies 26, and exterior and interior components are installed in two unitized compact vehicle bodies 11, these components can be assembled in approximately the same time as the assembly time for an ordinary vehicle body 26.

The right and left side doors 14, 15, driver seats 17, passenger seats 18, and other components are thereby efficiently installed in compact vehicle bodies 11.

Furthermore, unitizing two compact vehicle bodies 11 makes it possible, for example, to install interior components such as roof panels, linings, and carpets in passenger compartments in pairs.

The installation costs of roof panels, linings, carpets, and other components of passenger compartments can thereby be reduced.

As described above, in the vehicle production line 30 of the first embodiment, two unitized compact vehicle bodies 11 can be painted in approximately the same amount of time as an ordinary vehicle body 26, and the components of the two unitized compact vehicle bodies 11 can be installed in approximately the same amount of time as the components of the ordinary vehicle body 26.

Consequently, two of the unitized compact automobiles 10 can be produced in approximately the same amount of time as one of the ordinary automobiles 25.

Thereby, when the vehicle bodies 11, 26 of the compact automobiles 10 and the ordinary automobile 25 are produced together, the compact automobiles 10 can be produced more efficiently.

Next, a vehicle assembly apparatus 80 of a second embodiment will be described with reference to FIG. 9. In the vehicle assembly apparatus 80 of the second embodiment, components identical or similar to those in the vehicle assembly apparatus of the first embodiment are denoted by the same numerical symbols, and descriptions thereof are omitted.

Figure 9:
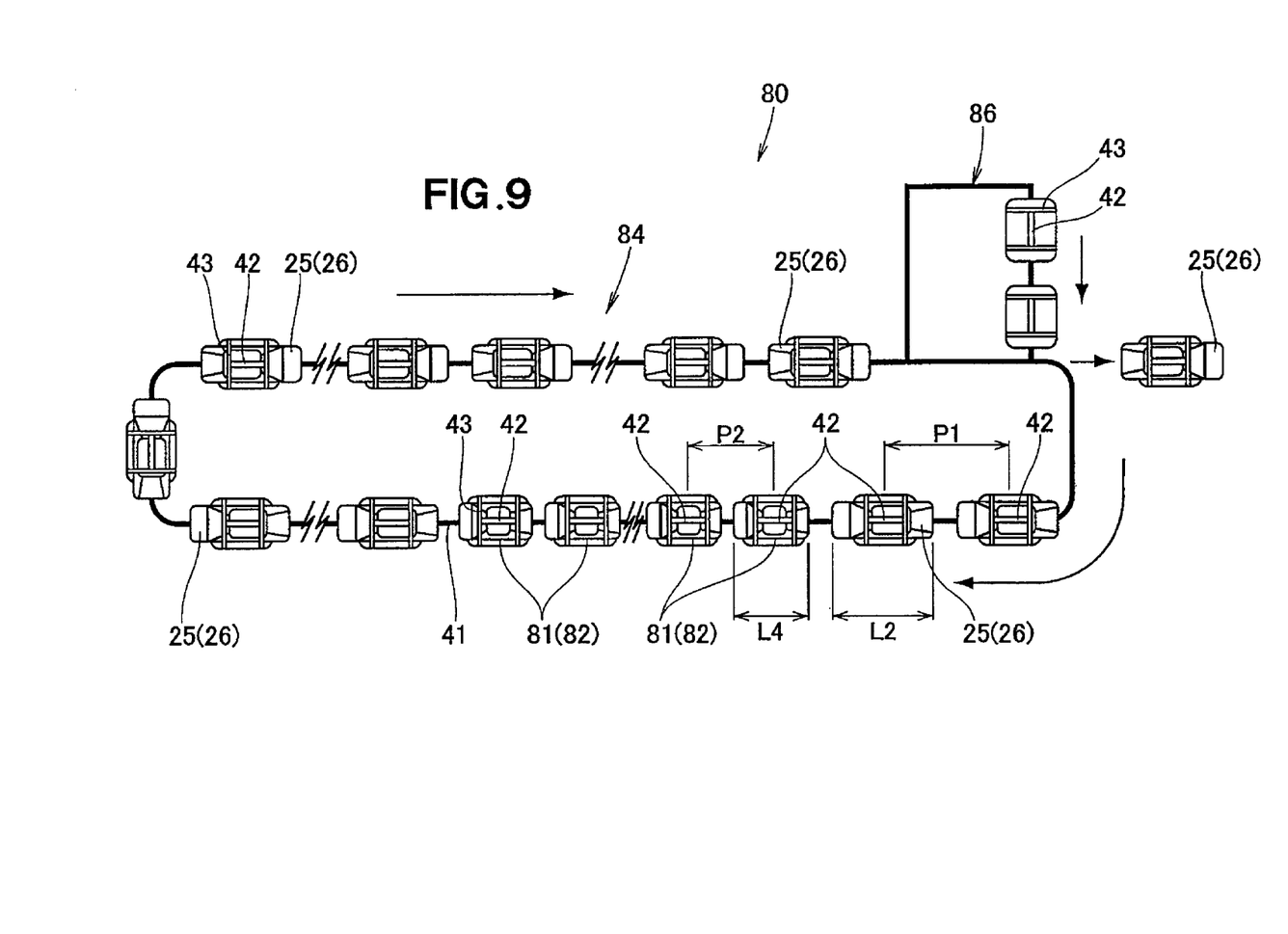
FIG. 9 is a schematic top plan view showing the production line for vehicles of different models according to a second embodiment of the present invention.

FIG. 9 shows an example of a drive system assembly area in the vehicle assembly apparatus of the second embodiment.

The total length L4 of a compact automobile 81 is sometimes less than the total length L2 of the ordinary automobile 25 shown in FIG. 3, and greater than half the total length L2.

In this case, when the vehicle bodies (hereinafter referred to as "compact vehicle bodies") 82 of compact automobiles 81 are mounted in units of two on the conveying hanger 43, the total length of each two of the unitized compact vehicle bodies 82 is greater than the total length L2 of each of the ordinary vehicle bodies 26. Therefore, it is difficult to mount and unitize the compact vehicle bodies 82 in pairs on the conveying hanger 43.

In view of this, in the vehicle assembly apparatus 80 of the second embodiment, for example, the drive system assembly area 84 comprises a sub-line 86, and dollies 42 and conveying hangers 43 can be provided to the guide rail 41 after the sub-line 86.

In other words, when the compact vehicle bodies 82 are assembled together with the ordinary vehicle bodies 26, the dollies 42 for mounting compact vehicle bodies 82 held in the sub-line 86 are added to the guide rail 41 during intervals.

The intervals P2 between the dollies 42 for mounting the compact vehicle bodies 82 are thereby smaller than the intervals P1 between the dollies 42 for mounting the ordinary vehicle bodies 26.

Each of the compact automobiles 81 has fewer components than each of the ordinary automobiles 25. Therefore, the intervals P2 between the dollies 42 for mounting the compact vehicle bodies 82 are reduced to make the number of steps for assembling the multiple compact automobiles 81 match the number of steps for assembling each of the ordinary automobiles 25. As an example, the number of steps for assembling five of the compact automobiles 81 matches the number of steps for assembling three of the ordinary automobiles 25. Therefore, the time required to assemble five of the compact automobiles 81 is approximately the same as the time required to assemble three of the ordinary automobiles 25, multiple automobiles of different models can be assembled with one assembly line, and the vehicles are produced more efficiently at low cost.

In the vehicle assembly apparatus 80 of the second embodiment shown in FIG. 9, an example of a drive system assembly area 84 was described, but this description also applies to a painting area and an exterior and interior assembly area.

In the exterior and interior assembly area, the compact vehicle bodies 82 and ordinary vehicle bodies 26 can be conveyed by a conveyer instead of dollies 42 and conveyor hangers 43 on a guide rail 41. Consequently, in the exterior and interior assembly area, the interval between the compact vehicle bodies 82 conveyed by the belt conveyor is P2, and the interval between the ordinary vehicle bodies 26 is P1.

As described above, in the vehicle assembly line 80 of the second embodiment, the number of steps for assembling multiple compact automobiles 81 can be matched with the number of steps for assembling ordinary automobiles 25 by reducing the intervals P2 between dollies 42 for mounting compact vehicle bodies 82. Thereby, when the compact automobiles 81 and ordinary automobiles 25 are produced together, the compact automobiles 81 can be produced more efficiently.

The shapes of the dollies 42 and conveying hangers 43 depicted in the previous embodiments are not limited to the examples depicted, and the designs thereof can be appropriately varied.

Obviously, various minor changes and modifications of the present invention are possible in light of the above teaching. It is therefore to be understood that within the scope of the appended claims the invention may be practiced otherwise than as specifically described.

What is claimed is:

1. A production line for vehicles of different models, comprising:
a plurality of conveying mechanisms conveying along a conveying line respective conveyance devices with vehicle bodies carried thereon in such a manner as to allow components to be installed on the vehicle bodies,
wherein the conveying line defines a conveying direction and each of the conveying devices carries two of the vehicle bodies such that one of the vehicle bodies is disposed in front of the other of the vehicle bodies on a same conveyance device in the conveying direction.

2. The production line of claim 1, wherein a total length of the two vehicle bodies to be carried on one of the conveying devices is equal to a maximum total length of an ordinary one of the vehicle bodies to be conveyed along the conveying line.

3. The production line of claim 1, wherein a total length of the two vehicle bodies to be carried on one of the conveying devices is less than a maximum total length of an ordinary one of the vehicle bodies to be conveyed along the conveying line.

4. The production line of claim 1, wherein the two vehicle bodies to be carried on one of the conveying devices have an occupant capacity of two people.

5. The production line of claim 1, wherein when the two vehicle bodies are to be carried on one of the conveying devices, the two vehicle bodies are placed such that rear parts thereof face each other.

6. A production line for vehicles of different models, comprising:
a conveying line that defines a conveying direction; and
a plurality of conveyance devices conveyed along the conveying line and designed to carry a single first vehicle body,
wherein one of the conveyance devices carries two second vehicle bodies such that one of the second vehicle bodies is disposed in front of the other of the second vehicle bodies on a same conveyance device in the conveying direction, and wherein the second vehicle bodies are of a different model than the first vehicle body.

7. The production line of claim 6, wherein a total length of the two second vehicle bodies carried on the one conveyance device is equal to a maximum total length of the first vehicle body.

8. The production line of claim 6, wherein a total length of the two second vehicle bodies carried on the one conveyance device is shorter than a maximum total length of the first vehicle body.

9. The production line of claim 6, wherein the two second vehicle bodies are carried on the conveyance device such that rear parts thereof face each other.

10. The production line of claim 6, wherein the conveyance device has a plurality of brackets for supporting the first vehicle body or the two second vehicle bodies in an anteroposterior direction of the vehicles carried thereon.

11. A method for producing vehicles of different models, comprising the steps of:
providing a conveying line that defines a conveying direction;
mounting a single first vehicle body onto a conveyance device;
mounting two second vehicle bodies onto an alternate conveyance device so that one of the second vehicle bodies is in front of the other second vehicle body in the conveying direction; and conveying the conveying device and the alternate conveyance device along the conveying line, wherein the second vehicle bodies are of a different model than the first vehicle body.

12. A production line for vehicles of different models, comprising:
- a conveying line that defines a conveying direction;
- a plurality of first conveyance devices conveyed along the conveying line and used for mounting a first vehicle body; and
- a sub-line including a plurality of second conveyance devices, wherein each of the second conveyance devices carries two second vehicle bodies that each have a maximum length in the conveying direction that is less than a maximum total length of the first vehicle body in the conveying direction, and wherein the second conveyance devices are supplied to the conveying line so as to be spaced from one another a distance along the conveying line that is less than a distance between the first conveyance devices along the conveying line.

* * * * *